(12) United States Patent
Takado (10) Patent No.: US 6,248,817 B1
(45) Date of Patent: *Jun. 19, 2001

(54) INFRARED ABSORBER AND AGRICULTURAL FILM

(75) Inventor: Kanemasa Takado, Toyama (JP)

(73) Assignee: Fuji Chemical Industry Co., Ltd., Toyama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/284,775

(22) PCT Filed: Oct. 16, 1997

(86) PCT No.: PCT/JP97/03745

§ 371 Date: Apr. 20, 1999

§ 102(e) Date: Apr. 20, 1999

(87) PCT Pub. No.: WO98/17739

PCT Pub. Date: Apr. 30, 1998

(30) Foreign Application Priority Data

Oct. 24, 1996 (JP) .................................................. 8-300888

(51) Int. Cl.$^7$ ......................... C08K 5/5333; A01G 13/04
(52) U.S. Cl. ........................ 524/127; 524/417; 524/424; 524/436; 523/135; 423/420.2; 423/421; 423/179.5; 47/2; 47/29
(58) Field of Search ..................................... 524/103, 492, 524/449, 127, 379, 275, 293, 417, 434, 424, 436; 523/135, 202; 47/2, 9, 29; 252/587; 423/328.2, 420.2, 421, 637, 179.5, 463, 600

(56) References Cited

U.S. PATENT DOCUMENTS 5,767,179 * 6/1998 Takado .................. 524/103
5,997,836 * 12/1999 Sato et al. .......................... 423/420.2

FOREIGN PATENT DOCUMENTS

0 672 619 A1  9/1995 (EP) .
0 761 756 A1  3/1997 (EP) .

* cited by examiner

Primary Examiner—David W. Wu
Assistant Examiner—R. Harlan
(74) Attorney, Agent, or Firm—Nath & Associates PLLC; Harold L. Novick (57) ABSTRACT

An infrared absorber which comprises containing as an effective ingredient a hydroxide complex salt represented by the formula

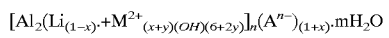

(wherein $M^{2+}$ is a divalent metal, $A^{n-}$ is an anion having a valence of n, and m, x and y are numbers respectively in the ranges of $0 \leq m < 5$, $0.01 \leq x \leq 0.5$ and $0 \leq y \leq 0.5$), which has a high ability to absorp infrared rays and a refractive index close to that of the resin so that it has a good dispersibility with the resins when incorporated in the resin and the shaped film therefrom is excellent in the heat insulation property and transparency so that it is suitable as an agricultural film.

10 Claims, 3 Drawing Sheets

INFRARED ABSORBER AND AGRICULTURAL FILM

TECHNICAL FIELD

The present invention relates to an infrared absorber consisting of a complex hydroxide salt which may be represented by the formula $$[Al_2(Li_{(1-x)}\cdot M^{2+}{}_{(x+y)}(OH)_{(6+2y)}]_n(A^{n-})_{(1+x)}\cdot mH_2O$$

(wherein $M^{2+}$ is a divalent metal, $A^{n-}$ is an anion having a valence of n, and m, x and y are numbers respectively in the ranges of $0 \leq m < 5$, $0.01 \leq x \leq 0.5$ and $0 \leq y \leq 0.5$) and an agricultural film prepared by incorporating said infrared absorber into a resin and shaping the mixture into a film.

PRIOR ART

An agricultural film which is being used in a greenhouse cultivation such as growing in houses or tunnels is required to have characteristic properties such that infrared rays radiated from the ground and plants are prevented from being liberated outside the houses or tunnels by the absorption, reflection, etc. during the night while the sunlight is transmitted efficently at a high transmission rate into the houses or tunnels during the daytime. It is known that the infrared rays radiated at a high radiation rate from the ground and plants lie in wavelengths ranging from 5~25 $\mu$m. It is required for the agricultural film to be capable of absorbing infrared rays having wavelengths from 5 to 25 $\mu$m, especially wavelengths in the vicinity of 10 $\mu$m which is the maximum radiation rate.

For the above agricultural film, magnesium carbonate, magnesium silicate, silicon dioxide, aluminum oxide, barium sulfate, calcium sulfate, magnesium hydroxide, aluminum hyroxide, calcium hydroxide, phosphates, silicates, hydrotalcites have been hitherto employed as infrared absorbers.

However, these inorganic powders used hitherto have both respective merits and demerits, and none of them fully meets the above requirements for properties. For example, silicon dioxide and magnesium silicate are excellent in the infrared absorptivity but have problems in the refractive index and dispersibility with the result that they impair the light transmittance of film. Thus, they are not suitable for use as the agricultural film. Also, hydrotalcites are relatively excellent in the dispersibility and refractive index but they are not fully satisfactory in infrared absorptivity.

Also, the Japanese Patent Kokai No. Hei 7-300313 discloses a technics using a lithium aluminum complex hydroxide salt as a heat insulation agent for an agricultural film. This hydroxide salt has a defect that it causes a bad transparency because it has a refractive index of 1.55 which is far apart from the value of about 1.50 that is the refractive index of polyolefin resin.

DISCLOSURE OF THE INVENTION

It is an object of the present invention to provide an infrared absorber and an agricultural film, said infrared absorber having a high ability to absorb infrared rays and a good dispersibility when incorporated into a resin, and a refractive index which is near to that of the resin so that the film shaped therefrom has excellent heat insulation property and transparency.

As a result of having ardently studied to solve the above problems, the present inventors have found that the above problems may be solved by a basic complex hydroxide salt which may be represented by the following formula (I)

$$[Al_2(Li_{(1-x)}\cdot M^{2+}{}_{(x+y)}(OH)_{(6+2y)}]_n(A^{n-})_{(1+x)}\cdot mH_2O \quad (I)$$

(wherein $M^{2+}$ is a divalent metal, $A^{n-}$ is an anion having a valence of n, and m, x and y are numbers respectively in the ranges of $0 \leq m < 5$, $0.01 \leq x \leq 0.5$ and $0 \leq y \leq 0.5$) and which has a high ability to absorb infrared rays in the vicinity of 10 $\mu$m of wavelength and which has a basal skeleton composed of an aluminum hydroxide octahedron layer of the gibbsite structure, and have completed the present invention.

That is, the present invention is an infrared absorber which is characterized by containing as an effective ingredient the complex hydroxide salt represented by the above formula (I) [hereinafter, referred to as the compound (I)]. The compound (I) of the present invention is one (in the case of y=0) which has a basic structure composed of a basal skeleton formed by entering lithium and divalent ions into a vacant site of an aluminum hydroxide octahedron layer of the gibbsite structure and an interlayer wherein an anion is introduced.

Also, it is a complex hydroxide salt wherein a hydroxide of divalent metal is entered into the basic structure (in the case of 0<y<1). Although this divalent metal is not limited particularly, Mg, Zn, Ca and the like are preferred from the viewpoints that they may be easily introduced, have white color and meet transparency when incorporated into film.

$A^{n-}$ represents a n-varent anion. Examples of anion include c rbonic acid, phosphoric, acid, silicic, acid, acetic acid, propionic acid, adipic acid, benzoic acid, phthalic acid, terephtharic acid, maleic acid, fumaric acid, citric acid, tartaric acid, succinic acid, p-hydrpxybenzoic acid, salicylic acid, picric acid, sulfuric acid, nitric acid, hydrochloric acid, iodine, fluorine, bromine and the like. Phosphoric acid, carbonic acid and silicic acid may be preferably used.

In the case that the infrared absorber of the present invention, that is the infrared absorber which is characterized by containing as an effective ingredient the compound (I) as above-mentioned is used to be incorporated into films such as agricultural film and so on, one having a very fine particle, a high dispersibility and a relatively developed crystal are preferred. Therefore, the average secondary particle size is preferably below 3 $\mu$m, more preferably below 1 $\mu$m. Also, the BET specific surface area is preferably below 50 m$^2$/g, more preferably below 20 m$^2$/g.

The followings illustrate in detailes a process for preparing the compound (I) of the present invention where $M^{2+}$ is Mg as a specific example.

The compound (I) of the present invention in the case of $M^{2+}$ being Mg and y=0, a basic aluminum magnesium complex hydroxide of carbonate ion type $[Al_2Li_{(1-x)}\cdot Mg_{(x)}(OH)_6]_n(CO_3)_{(1+x)}\cdot mH_2O$ may be prepared by the following process.

Aluminum hydroxide is reacted with lithium carbonate and carbonate of magnesium such as magnesium carbonate and basic magnesium carbonate in an aqueous medium under heat treatment.

Lithium carbonate and magnesium carbonate or basic magnesium carbonate may be used in such a amount that [Li/Al$_2$O$_3$ (molar ratio)]+[MgO/Al$_2$O$_3$ (molar ratio)] becomes 1 with respect to the content of Al$_2$O$_3$ in aluminum hydroxide. However, slight excess of lithium component may be added.

A complex hydroxide salt (in the case of $0 < y \leq 0.5$) wherein magnesium hydroxide is introduced may be prepared by reacting aluminum hydroxide with lithium carbonate, carbonate of magnesium such as magnesium carbonate and basic magnesium carbonate and one or more of water soluble magnesium salts selected from the group consisting of magnesium chloride, magnesium sulfate, magnesium nitrate and magnesium hydroxide in an aqueous medium under heat treatment. In this case too, lithium carbonate and magnesium carbonate or basic magnesium carbonate may be used in such a amount that [Li/Al$_2$O$_3$ (molar ratio)]+[MgO/Al$_2$O$_3$ (molar ratio)] becomes 1 with respect to the content of Al$_2$O$_3$ in aluminum hydroxide. However, slight excess of lithium component may be added.

The temperature range for heat treatment is preferably an appropriate temperature ranging from an ordinary temperature to 200° C., more preferably 90~160° C., most preferably 110~160° C. In the case where treatment temperature is lower than the ordinary temperature, it is not preferable because the extent of crystallinity becomes low.

The above complex metal hydroxide salt of carbonate ion type may be treated with acids, for example mineral acids such as nitric acid, halogenic acid such as hydrochloric acid, sulfuric acid and so on or organic acids, for example monocarboxylic acid (monobasic organic acid) such as acetic acid, thereby the carbonate ion intercalated between layers may be substituted by other anion. By selecting the starting materials properly the complex metal hydroxide salt of other anion type which may be obtained by the above treatment is converted into a basic lithium magnesium aluminum complex hydroxide salt wherein ion intercalated between the layers is halogen ion, nitric acid ion, sulfuric ion, monocarboxylic acid ion and so on without passing through step for the above basic lithium magnesium aluminum complex metal hydroxide salt of carbonate ion type.

The compound (I) of the present invention may be subjected to hydrothermal treatment using an autoclave and the like thereby BET specific surface area and secondary particle size may be adjusted to suitable range. The temperature range for hydrothermal treatment is preferably 100~200° C., more preferably 110~160° C. The preparation of other divalent metal than Mg with respect to M$^{2+}$ may also be conducted in a similar manner as that of the Mg type and there is no particular care to be taken for it.

The infrared absorber of the present invention may be surface-treated with a coating agent thereby excellent dispersibility may be achieved. As examples of coating agent there may be taken higher fatty acids, higher fatty acid salts, phosphoric esters of higher aliphatic alcohols, waxes, nonionic surfactants, cationic surfactants, coupling agent and the like. Higher fatty acids, higher fatty acid salts, phosphoric esters of higher aliphatic alcohols, nonionic surfactants, cationic surfactants or coupling agent are preferred.

As higher fatty acids, for example lauric acid, palmitic acid, oleic acid, stearic acid, capric acid, myristic acid and linoleic acid are taken. As higher fatty acid salts, for example sodium or potassium salt of the above higher fatty acids are taken. As phosphoric esters of higher aliphatic alcohols, for example alkyl ether phosphoric acid such as lauryl ether phosphoric acid, stearyl ether phosphoric acid, oleyl ether phosphoric acid; dialkyl ether phosphoric acid; alkyl phenyl ether phosphoric acid; dialkyl phenyl ether phosphoric acid; alkyl ether phosphoric acid salts such as sodium oleyl ether phosphate, potassium stearyl ether phosphate are taken.

As nonionic surfactants, for example alkylol amides such as coconut oil fatty acid monoethanol amide, lauric acid diethanol amide and the like; polyoxyalkyl phenyl ethers such as polyoxyethlene alkyl phenyl ether and the like; polyoxyethylene alkyl ether such as polyoxyethylene lauryl ether and the like; polyethylene glycol fatty acid esters such as distearic acid polyethylene glycol and the like; sorbitan fatty acid esters such as monocapric acid sorbitan, monostearic acid sorbitan, distearic acid sorbitan and the like; polyoxyethylene sorbitan fatty acid ester such as monostearic acid polyoxyethylene sorbitan and the like; polyoxyethylene sorbit fatty acid ester, polyoxyethylene polyoxypropylene alkyl ethers, glycol ethers and so on are taken.

As cationic surfactants, for example alkyl trimethyl ammonium salts such as lauryl trimethyl ammonium chloride, cetyl trimethyl ammonium bromide, stearyl trimethyl ammonium chloride and the like; alkyl dimethylbenzyl ammonium salts such as stearyl dimethylbenzyl ammonium chloride, benzalkonium chloride, lauryl dimethylbenzyl ammonium chloride and the like are taken.

As amphoteric surfactants, for example alkyl betaine such as coconut oil alkylbetaine and the like; alkylamide betaine such as lauryl dimethylamino acetic acid betaine and the like; imidazoline such as Z-alkyl-N-carboxymethyl-N-hydroxyethylimidazolium betaine; glycines such as polyoctylpolyaminoethyl glycine and the like are taken.

As coupling agent, for example silane coupling agent, aluminum coupling agent, titanium coupling agent, zirconium coupling agent and the like are taken.

One or more of the above coating agents may be used in the present invention.

The amount added of the coating agent is 0.1~10% by weight, preferably 0.5~6% by weight. The amount less than 0.1% by weight gives a bad dispersibility. When the amount exceeds 10% by weight the effect is sufficient but it is not economically advantageous.

The surface treatment may be easily conducted by either dry or wet method according to the conventional method.

Second feature of the present invention lies in an agricultural film wherein the above infrared absorber is incorporated and the process of its preparation. The agricultural film of the present invention may be prepared by the method as stated below.

First, a resin and the infrared absorber of the present invention are added in a mixer such as a ribbon blender, a Banbury mixer, a supermixer or a Henschel mixer and mixed, and thereafter melt-kneaded with an extruder, Banbury mixer or pressure kneader according to the conventional method.

The amount of the infrared absorber to be used may be preferably 1~50 parts by weight, more preferably 1~20 parts by weight based on 100 parts by weight of the resin.

When it is less than 1 part by weight, the absorption of infrared rays is not sufficient. On the other hand, when it exceeds 50 parts by weight, light transmittance and mechanical strength required for an agricultural film are lowered.

Examples of the resin include polyhalogenated vinyl such as polyvinyl chloride, polyvinylidene chloride; halogenated polyethylene, halogenated polypropylene, copolymers comprising combination of vinyl chloride-vinyl acetate, vinyl chloride-ethylene, vinyl chloride-propylene, vinyl chloride-styrene, vinyl chloride-isobutylene, vinyl chloride-vinylidene chloride, vinyl chloride-styrene-acrylonitrile, vinyl chloride-butadiene, vinyl chloride-propylene chloride, vinyl chloride-vinylidene chloride-vinyl acetate, vinyl chloride-maleic acid ester, vinyl chloride-methacrylic acid ester, vinyl chloride-acrylonitrile; polymers or copolymers of olefins such as ethylene, propylene, butene-1, vinyl acetate and the like; polyethylenes such as LLPE, LDPE and the like; polypropyrene; ethylene-α-olefin copolymer such as ethylene-propylene copolymer, ethylene-butene-1 copolymer, ethylene-4-methyl-1-pentene copolymer, ethylene-hexene copolymer and the like; ethylene-vinyl acetate copolymer, ethylene-acrylic acid copolymer, ethylene-methyl methacrylate copolymer, ethylene-vinyl acetate-methyl methacrylate copolymer, ionomer resin and the like. Among these resins, polyethylene, ethylene-α-olefin copolymer, ethylene-vinyl acetate copolymer having less than 25% by weight of vinyl acetate content are preferred in considering the aspects of transparency, weathering resistance and price.

The resin composition prepared by mixing, melting and kneading operations may be shaped into a film e.g. an agricultural film according to the conventional method e.g. inflation, calendering or T-die extrusion.

One side or both sides of the film may be provided with another resin layer to prepare a multilayer film. This multilayer film can be prepared by a lamination such as dry lamination or heat lamination or a coextrusion such as T-die coextrusion or inflation coextrusion.

For preparation of the agricultural film of the present invention, there may be added according to the necessity various kinds of the resin additives used conventionally such as a plasticizer, a lubricant, a light stabilizer, an antioxidant, an antistatic agent, a pigment, an ultraviolet absorber, an anti-fogging agent, an anti-haze agent, a thermal stabilizer, an anti-blocking agent, a dye, a heat insulating agent and the like.

Examples of plasticizers include low molecule weight of polyhydric alcohol plasticizers such as glycerin, ethylene glycol, triethylene glycol, sorbitol and the like; phthalic ester plasticizers such as dioctyl phthalate (DOP), dimethyl phthalate and the like; phosphoric ester plasticizers, paraffin plasticizers, wax plasticizers and the like. Among these, polyhydric alcohols have anti-fogging action toward film, too.

Exampls of lubricants include fatty acids such as stearic acid, oleic acid, palmitic acid and the like; metal salts thereof; fatty acid amide derived from above fatty acids; waxes such as polyethylene wax and the like, liquid paraffin, ester such as glycerin fatty acid ester and higher alcohols.

Examples of light stabilizers include hindered amines, cresols, melamines, benzoic acid and the like.

Examples of hindered amine light stabilizers include 2,2,6,6-tetramethyl-4-piperidylstearate, 1,2,2,6,6-pentamethyl-4-piperidylstearate, 2,2,6,6-tetramethyl-4-piperidinylbenzoate, N-(2,2,6,6-tetramethyl-4-piperidyl) dodecyl succinic acid imide, 1-(3,5-di-tert-butyl-4-hydroxyphenyl)propionyloxyethyl-2,2,6,6-tetramethyl-4-piperidyl(3,5-di-tert-butyl-4-hydroxyphenyl)propionate, bis (2,2,6,6-tetramethyl-4-piperidyl)sebacate, bis(1,2,2,6,6-pentamethyl-4-piperidyl)-2-butyl-2-(3,5-di-tert-butyl-4-hydroxybenzyl)maloate, N,N'-bis(2,2,6,6-tetramethyl-4-piperidyl)hexamethylenediamine, tetra(1,2,2,6,6-pentamethyl-4-piperidyl)butanetetracarboxylate, tetra(2,2,6,6-tetramethyl-4-piperidyl)butanetetracarboxylate, bis(1,2,2,6,6-pentamethyl-4-piperidyl)di(tridecyl) butanetetracarboxylate, bis(2,2,6,6-tetramethyl-4-piperidyl) di(tridecyl)butanetetracarboxylate, 3,9-bis{1,1-dimethyl-2-[tris(2,2,6,6-tetramethyl-4-piperidyloxycarbonyloxy) butylcarbonyloxy]ethyl}-2,4,8,10-tetraoxaspiro[5,5] undecane, 3,9-bis{1,1-dimethyl-2-[tris(1,2,2,6,6-tetramethyl-4-piperidinyloxycarbonyloxy) butylcarbonyloxy]ethyl}-2,4,8,10-tetraoxaspiro[5,5] undecane, 1,5,8,12-tetrakis {4,6-bis[N-(2,2,6,6-tetramethyl-4-piperidyl)butylamino]-1,3,5-triazine-2-yl}-1,5,8,12-tetrazadodecane, 1-(2-hydroxyethyl)-2,2,6,6-tetramethyl-4-piperidinol/succinic acid dimethyl ester condensate, 2-tert-octylamino-4,6-dichloro-s-triazine/N,N'-bis(2,2,6,6-tetramethyl-4-piperidyl)hexamethylenediamine condensate, N,N'-bis(2,2,6,6-tetramethyl-4-piperidyl) hexamethylenediamine/dibromoethane condensate and the like.

It is suitable that the amount of the light stabilizers to be incorporated is 0.02 to 5 parts by weight per 100 parts by weight of resins. The use of too small amount does not exert the effect, while the use of too large amount impairs the transparency of the film.

As antioxidants, phenol, phosphorus, sulfur containing ones may be taken.

Examples of phenolic antioxidants include 2,6-di-tert-butyl-p-cresol, 2,6-diphenyl-4-octadecyloxylphenol, stearyl (3,5-di-tert-butyl-4-hydroxyphenyl)propionate, distearyl(3, 5-di-tert-butyl-4-hydroxybenzyl)phosphate, thiodiethylene glycol bis[(3,5-di-tert-butyl-4-hydroxyphenyl)propionate], 1,6-hexamethylene bis[(3,5-di-tert-butyl-4-hydroxyphenyl) propionate], 1,6-hexamethylene bis[(3,5-di-tert-butyl-4-hydroxyphenyl)propionamide], 4,4'-thiobis(6-tert-butyl-m-cresol), 2,2'-methylene bis(4-methyl-6-tert-butylphenol), 2,2'-methylene bis(4-ethyl-6-tert-butylphenol), bis[3,3-bis (4-hydroxy-3-tert-butylphenyl)butyric acid]glycol ester, 4,4'-butylidene bis(6-tert-butyl-m-cresol), 2,2'-ethylidene bis(4,6-di-tert-butylphenol), 2,2'-ethylidene bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocynurate, tetrakis [methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis {1,1-dimethyl-2-[(3-tert-butyl-4-hydroxy-5-methylphenyl) propionyloxy]ethyl}- 2,4,8,10-tetraoxaspiro[5,5]undecane, triethylene glycol bis[(3-tert-butyl-4-hydroxy-5-methylphenyl)propionate] and the like.

Examples of phosphorus antioxidants include tris (nonylphenyl) phosphite, tris(2,4-di-tert-butylphenyl) phosphite, tris [2-tert-butyl-4-(3-tert-butyl-4-hydroxy-5-methylphenylthio)-5-methylphenyl]phosphite, tridecyl phosphite, octyl diphenyl phosphite, di(decyl)monophenyl phosphite, monodecyl diphenyl phosphite, mono (dinonylphenyl) bis (nonylphenyl)phosphite, di(tridecyl) pentaerythritol diphosphite, distearyl pentaerythritol diphosphite, di(nonylphenyl)pentaerythritol diphosphite, bis (2,4-di-tert-butylphenyl)pentaerythritol diphosphite, bis(2, 6-di-tert-butyl-4-methylphenyl)pentaerythritol diphosphite, tetra(tridecyl)isopropylidenediphenyl diphosphite, tetra (tridecyl)isopropylidenediphenyl diphosphite, tetra($c_{12-16}$ mixed alkyl)-4,4'-n-butylidene bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphite, 2,2'-methylene bis(4,6-di-tert-butylphenyl)(octyl)phosphite and the like.

Examples of sulfur-containing antioxidants include dialkyldithiopropionate such as dilauryl, dimyristyl or distearyl ester of thiodipropionic acid; β-alkylmercaptopropionic acid ester of polyol such as tetra(β-dodecylmercaptopropionate) of pentaerithrytol.

It is suitable that the amount of the above antioxidants to be incorporated is about 0.01~3%.

As antistatic agents, there may be taken polyoxyethylene alkylamine, polyglycol ether, nonionic active agent, cationic active agent and so on.

As pigments, ones having a high transmittance are preferable.

As ultraviolet absorbers, there may be taken benzophenones, benzotriazoles, salicylic acid esters, substituted oxanilides, cyanoacrylates and the like.

Examples of benzophenones include 2-hydroxybenzophenones such as 2,4-dihydroxylbenzophenone, 2-hydroxy-4-methoxybenzophenone, 2-hydroxy-4-octoxybenzophenone, 5,5'-methylene bis(2-hydroxy-4-methoxy)benzophenone and the like.

Examples of benzotriazoles include 2-(2'-hydroxyphenyl)benzotriazoles such as 2-(2'-hydroxy-5'-methylphenyl) benzotriaozole, 2-(2'-hydroxy-3',5'-di-tert-butylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-benzotriazole)phenol and the like.

Examples of salicylic acid esters include benzoates such as phenylsalicylate, resorcinol monobenzoate, 2,4-di-tert-butylphenyl-3',5'-di-tert-butyl-4'-hydroxybenzoate, hexadecyl-3,5-di-tert-butyl-4-hydroxybenzoate and the like.

Examples of substituted oxanilides include 2-ethyl-2'-ethoxyoxanilide, 2-ethoxy-4'-dodecyloxanilide and the like.

Examples of cyanoacrylates include ethyl-α-cyano-,β,β-diphenyl acrylate, methyl-2-cyano-3-methyl-3-(p-methoxyphenyl)acrylate and the like.

As anti-fogging agents, there may be preferably employed nonionic, anionic and cationic surfactants.

Specifically, sorbitan fatty acid esters such as sorbitan monostearate, sorbitan monopalmitate, sorbitan monobehenate and the like, glycerin fatty acid esters such as glycerin monolaurate, glycerin monostearate, glycerin monopalmitate, diglycerin dilaurate, diglycerin distearate, diglycerin monopalmitate, triglycerin monostearate and the like, polyhydric alcohol surfactants including polyethylene glycol active agents such as polyethylene glycol monostearate, their alkylene oxide adducts, polyoxyalkylene ether, organic acid esters of sorbitans or glycerins may be taken.

As anti-haze agents, fluorine or silicone ones which have been conventionally used for agricultural film of polyolefin resins may be incorporated. It is preferable to use for example, low or high molecule compounds containing perfluoroalkyl or perfluoroalkenyl group which have at least 0.01% by weight of solubility in water and an ability to lower surface tension of water to below 35 dyn/cm preferably 30 dyn/cm at 25° C. Also, perfluoroalkyl group may be one containing an oxygen atom in the carbon chains.

Examples of fluorine surfactants include commercially available products "Unidyne DS-401", "Unidyne DS-403", "Unidyne DS-451" (Products of Daikin Industries Ltd.), "Megafac F-177" (product of Dainippon Ink & Chemicals Incorporated), "Florard FC-170", "Florard FC-176", "Florard FC-430" (products of Sumitomo 3M Ltd.), "Sarflone S-141", "Sarflone S-145", "Sarflone S-381", "Sarflone S-382, "Sarflone S-393" (products of Asahi Glass Co., Ltd.).

Examples of silicone anti-haze agents include polyether modified silicone oil, carboxy modified silicone oil and carbinol modified silicone oil and amino modified silicone oil. In general, ones are preferred which have at least 0.1% by weight of solubility in water and an ability to lower surface tension of water to below 35 dyn/cm at 25° C.

Examples of commercially available silicone surfactants include "KF-354" (a product of Shin-Etsu Chemical Co., Ltd.), "SH-3746" (a product of Dow Corning Toray Silicone Co., Ltd.) "TSF-4445" (a product of Toshiba Silicone Co., Ltd.). The anti-haze agents may be preferably incorporated in an amount of about 0.1~5% per 100 perts by weight of resins.

As thermal stabilizers, especially tin stabilizers, lead stabilizers, complex metal fatty acid stabilizers such as calcium-zinc, barium-zinc which are incorporated in vinyl chloride resins may be taken.

Also, other heat insulation agents, magnesium carbonate, magnesium silicate, silicon dioxide, aluminum oxide, barium sulfate, calcium sulfate, magnesium hydroxide, aluminum hydroxide, calcium hydroxide, phosphate, silicate, hydrotalcite may be employed to such extent that they do not impair the transparency of film.

One or more of the above various additives may be properly selected for incorporation. The amount of the additives to be incorporated may be such range that it causes no deterioration in the property of the film. It is not restricted particularly so long as it is within such range.

The agricaltural films of the present invention are 1) one which is characterized by incorporating 1~50 parts by weight of the complex hydroxide salt of the present invention into 100 parts by weight of a resin, 2) one which is characterized by incorporating 1~50 parts by weight of the complex hydroxide salt of the present invention and 0.02~5 parts by weight of a hindered amine light stabilizer into 100 parts by weight of a resin, 3) one which is characterized by incorporating 1~50 parts by weight of the complex hydroxide salt of the present invention and 0.02~5 parts by weight of an anti-fogging agent into 100 parts by weight of a resin, and 4) one which is characterized by incorporating 1~50 parts by weight of the complex hydroxide salt of the present invention and 0.02~5 parts by weight of an anti-haze agent into 100 parts by weight of a resin.

BEST MODES FOR CARRYING OUT THE INVENTION

The following examples illustrate the present invention more specifically.

The BET specific surface area can be measured from the amount adsorbed of nitrogen according to the conventional a method. The secondary particle size can be determined by a method which comprises adding sample powder to an organic solvent such as ethanol or n-hexane, dispersing by ultrasonic, dropping the dispersion on a sample mount for a microscope and observing under a microscope. An electron microscope, an optical microscope and so on can be used as the microscope.

EXAMPLE 1

Water was added to a mixture of 214.0 g of powdery aluminum hydroxide containing 65% by weight of $Al_2O_3$, 13.9 g of magnesium carbonate containing 42.0% by weight of MgO and 45.2 g of lithium carbonate to make 3 liters (L) of slurry in the total volume.

This slurry was subjected to heat treatment in 5 L of an autoclave at 150° C. for 4 hours. While the temperature of the slurry was kept to 80° C., 11.5 g of sodium stearate was added to carry out surface-treatment. Thereafter, the slurry was filtered to form a cake under reduced pressure with a Buchner funnel, and the cake was washed with a quantity of water equivalent to about 50 times of the $Al_2O_3$ content in weight. After washing, the cake was dried overnight at approximately 110° C. to yield 300 g of white powders.

The obtained white powders were subjected to chemical analysis. As the result, it had the composition of $[Al_2(Li_{0.90}.Mg_{0.10})(OH)_6]_2(CO_3)_{1.10}.3.0H_2O$. It had a BET specific surface area of 18.0 $m^2/g$, an average particle size of 0.85 $\mu$m and a refractive index of 1.53.

EXAMPLE 2

Water was added to a mixture of 214.0 g of powdery aluminum hydroxide containing 65% by weight of $Al_2O_3$, 13.9 g of magnesium carbonate containing 42.0% by weight of MgO, 15.7 g of magnesium hydroxide and 45.2 g of lithium carbonate to make 3 L of slurry in the total volume.

This slurry was subjected to heat treatment in 5 L of an autoclave at 150° C. for 4 hours. While the temperature of the slurry was kept to 80° C., 11.5 g of sodium stearate was added to carry out surface-treatment. Thereafter, the slurry was filtered to form a cake under reduced pressure with a Buchner funnel, and the cake was washed with a quantity of water equivalent to about 50 times of the $Al_2O_3$ content in weight. After washing, the cake was dried overnight at approximately 110° C. to yield 320 g of white powders.

The obtained white powders were subjected to chemical analysis. As the result, it had the composition of $[Al_2(Li_{0.90}.Mg_{0.30})(OH)_{6.4}]_2(CO_3)_{1.10}.3.0H_2O$. It had a BET specific surface area of 22.4 $m^2/g$, an average particle size of 1.05 $\mu$m and; a refractive index of 1.53.

EXAMPLE 3

The aluminum lithium magnesium complex hydroxide salt obtained in Example 2 was burned for a hour 210° C. to remove water contained in it and used as an infrared absorber to prepare an agricultural film, and the effectiveness was confirmed.

This infrared absorber was added in amounts of 5, 7.5 and 10 parts to 100 parts by weight of LDPE resin, and the respective mixtures were formed into pellets at about 200° C. using a double-screw extruder. The pellets were extruded through T-die to obtain agricultural film having 100 $\mu$m in thickness. The transparency and heat insulating effect of this agricultural film were measured. The heat insulating property was evaluated by measuring the infrared absorptivities of the obtained film at intervals of 20 $cm^{-1}$ in the wavelength range of 2000 $cm^{-1}$~400 $cm^{-1}$, and each measurement obtained was multiplied and the average of the obtain products was evaluated as a heat insulation efficiency. The greater the heat insulation efficiency, the greater the heat insulating effect.

Figure 1:
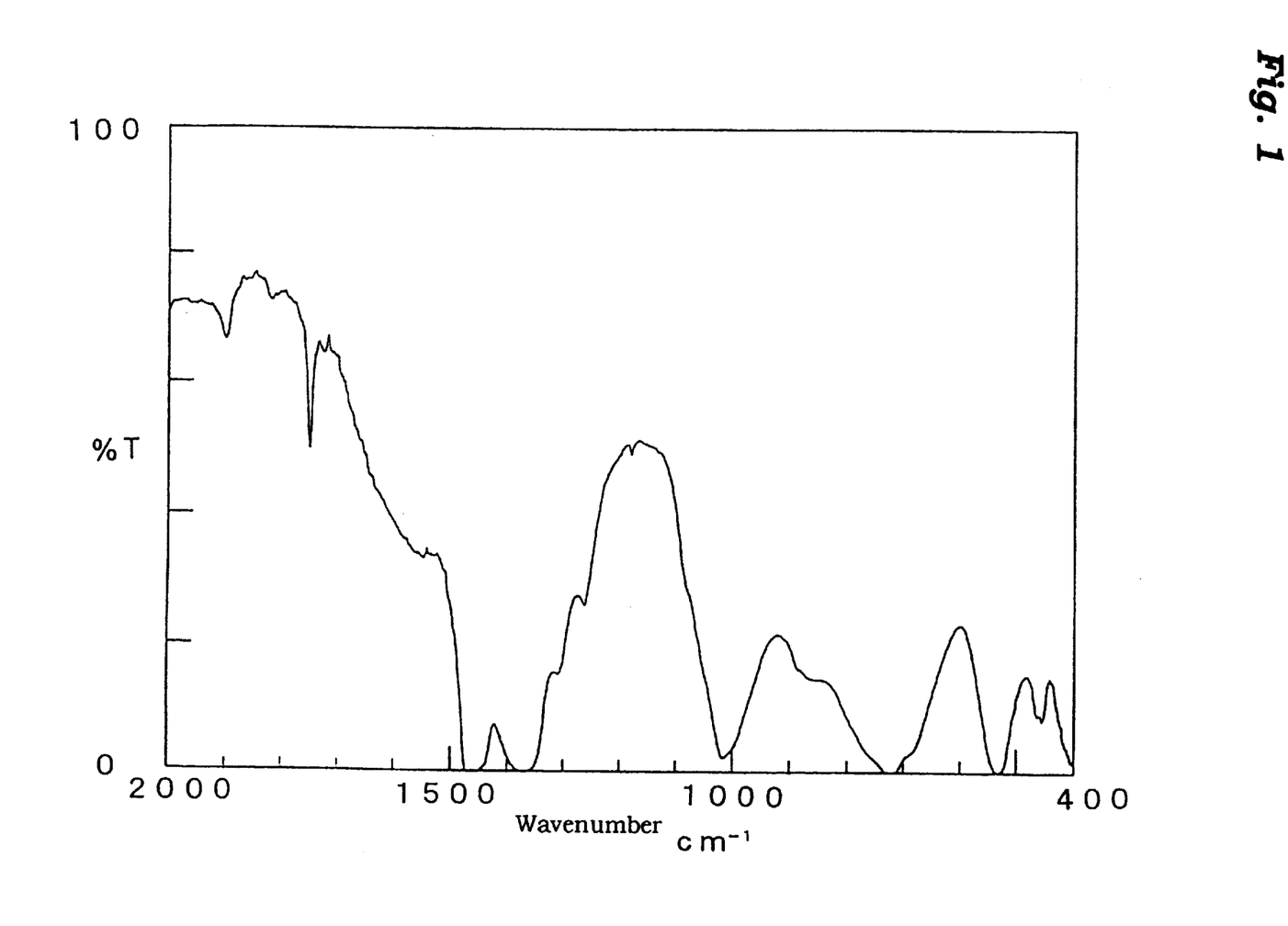
FIG. 1 is an infrared absorption spectrum of the agricultural film wherein 5 parts by weight of the infrared absorber obtained in Example 3 were incorporated.
Figure 2:
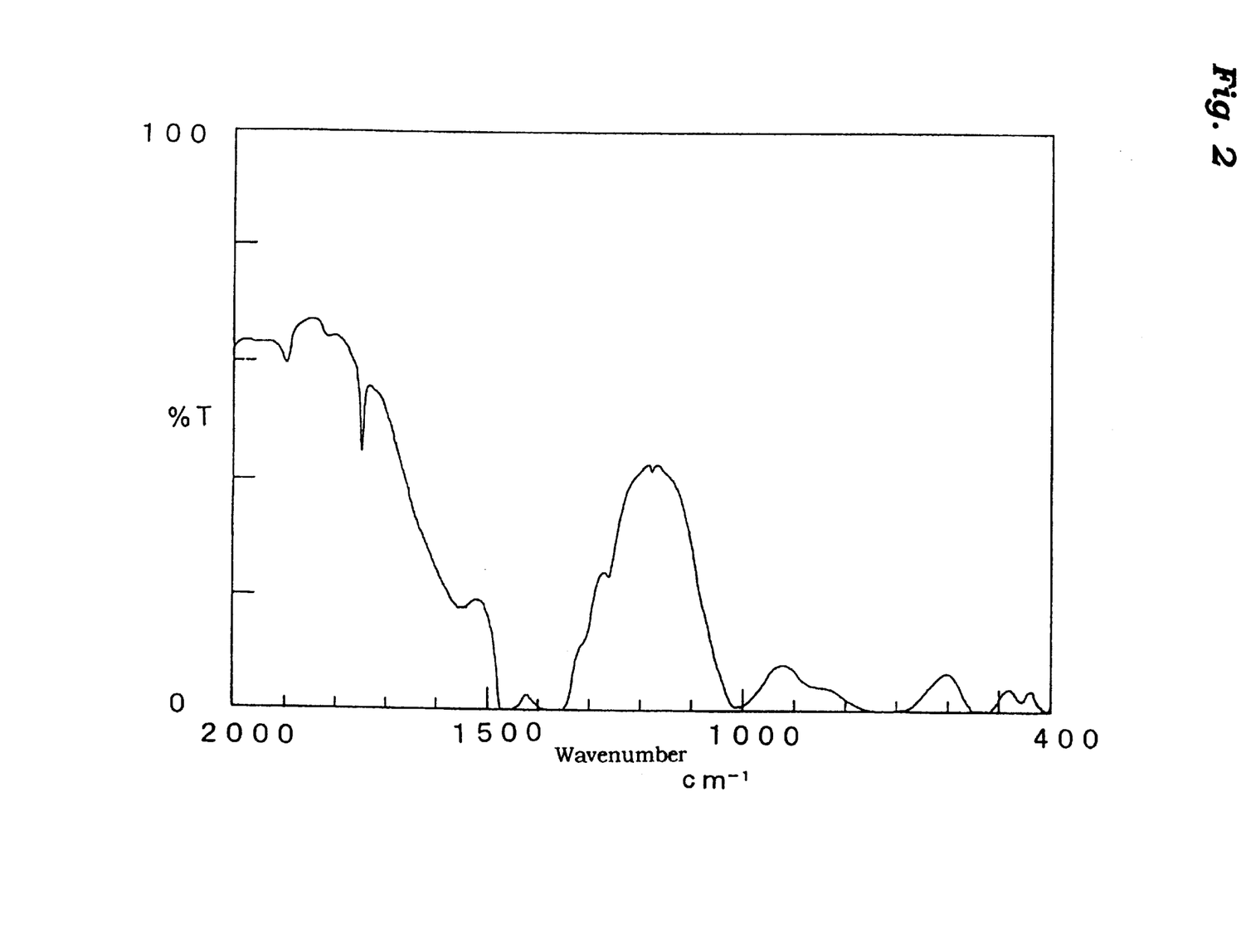
FIG. 2 is an infrared absorption spectrum of the agricultural film wherein 10 parts by weight of the infrared absorber obtained in Example 3 were incorporated.
Figure 3:
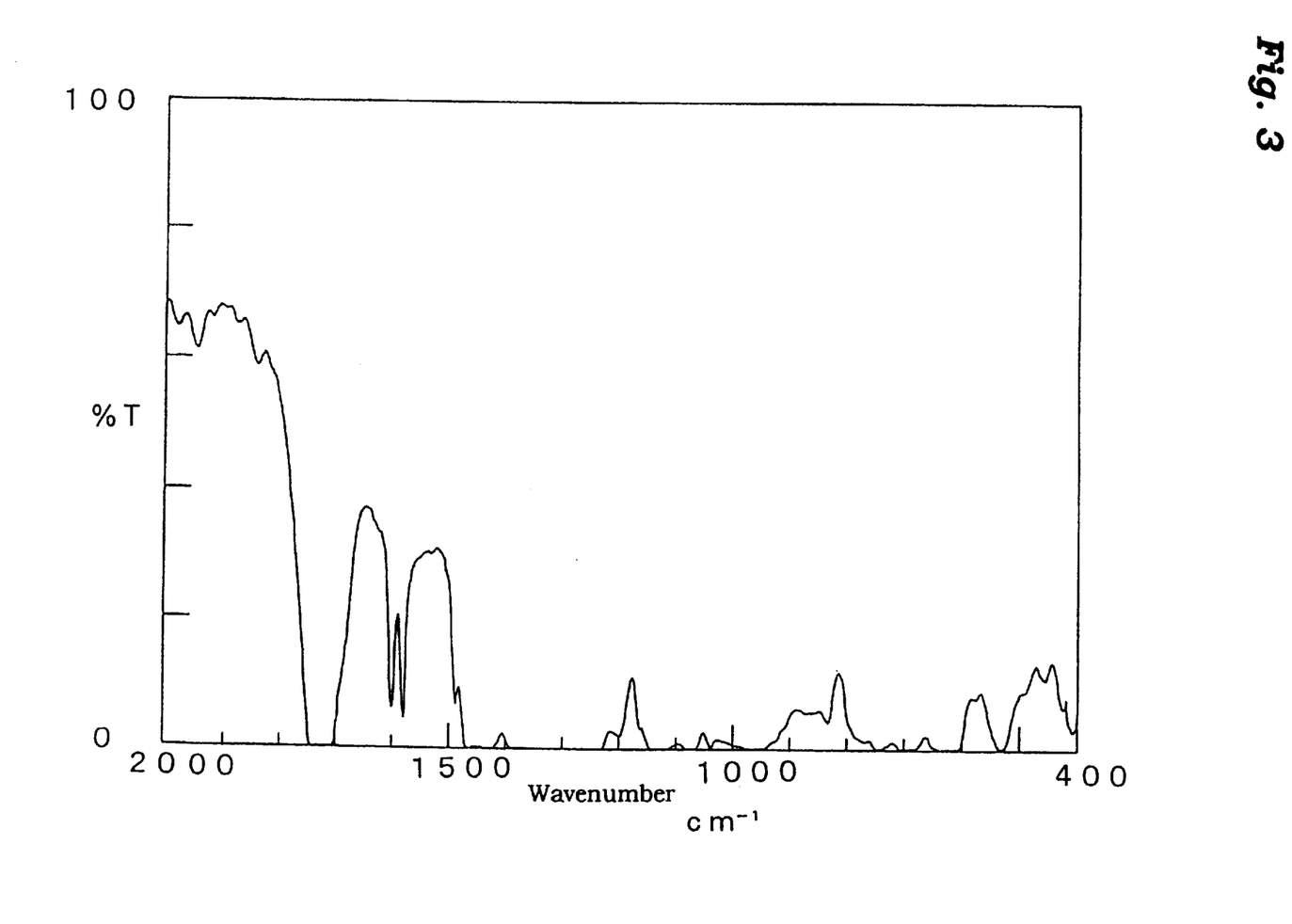
FIG. 3 is an infrared absorption spectrum of the agricultural film wherein 5 parts by weight of the infrared absorber obtained in Example 4 were incorporated.

The transparency was evaluated in transmittance percent to the total light of 700~400 nm which was measured using a spectrophotometer (a product of Japan Spectroscopic Co., Ltd.). The infrared absorption spectrum of the film wherein 5 parts by weight of the infrared absorber were incorporated is shown in FIG. 1 and that of the film wherein 10 parts by weight of the infrared absorber were incorporated is shown in FIG. 2. Also, the heat insulation efficiency and the total light transmittance percent (%) are shown in table 1.

EXAMPLE 4

100 parts by weight of polyvinyl chloride (degree of polymerization: 1300), 0.2 part by weight of zinc stearate, 0.2 part by weight of dibenzoylmethane, 10 parts by weight of the complex hydroxide obtained in Example 1 and 50 parts by weight of DOP were used, roll-milled at 170° C. and pressed to obtain an agricultural film having a thickness of 100 $\mu$m. The heat insulation efficiency and the total light transmittance of this agricultural film are shown in table 1.

EXAMPLE 5

To ethylene-vinyl acetate copolymer (14% by weight of vinyl acetate content and 0.92 $g/cm^3$ of density), were added 10.0% by weight of infrared absorber the compound obtained in Example 2 , 0.5% by weight of hindered amine light stabilzer "TINUVIN 622-LD" (a trade nama, a product of Ciba Geigy Co., Ltd.), 0.2% by weight of an antioxidant ("Irganock" a trade name, a product of Ciba Geigy Co., Ltd.), 1.0% by weight of monoglycerin monostearate, 1.0% by weight of diglycerin distearate as anti-fogging agent, 0.1% by weight of anti-haze agent "Unidyne DS-401" (a product of Daikin Industries Ltd.) and 0.2% by weight of lubricant stearylamide to become 100% in the total, mixed for 5 minutes 130° C. with a Banbury mixer and granulated with a granulating machine to obtain pellets of composition. They are designated as the resin composition A. Next, pellets of composition B were obtained in a similar manner except that no infrared absorber was added. The resin composition A was set as an intermediate layer while the resin composition B as both the outer layers to prapare a film having a thickness of 0.1 mm (0.06 mm of the intermediate layer and 0.02 mm of each outer layer) with an inflation film making machine, and the obtained film was subjected to outdoor exposure in the stretched state for 8 months of from April to November, 1995 under the condition of which its weathering resistance, anti-fogging property and anti-haze property were evaluated according to the following manners:

Weathering resistance was made by visual inspection, and the discoloration (yellowing and browning) and deterioration of film were checked. Also, an elongation test was conducted according to JIS K-6781 to measure the retention (%) of elongation, and the retention of 90% or more was evaluated to cause no deterioration.

Anti-fogging property was made by visual inspection, the formation of water droplets on the film was checked through the overall observation of it.

Anti-haze property was made by visual inspection, and the formation of haze on the film was checked through the overall observation of it.

As a result, all the agricultural films obtained in Examples involving in the present invention were found to have no problem with respect to the weathering resistance (neither discoloration nor deterioration of film was recognized), the anti-fogging property (there was no place to form droplet) and the anti-haze property (no haze generation is recognized).

EXAMPLE 6

Water was added to a mixture of 13.9 g magnesium carbonate containing 42.0% by weight of MgO, 15.7 g of magnesium hydroxide, 214.0 g of powdery aluminum hydroxide containing 65% by weight of $Al_2O_3$ and 53.2 g of lithium carbonate to make 3 L of slurry in total volume. The slurry was subjected to heat treatment in 5 l of an autoclave at 150° C. for 4 hours. After the heat treatment, to the slurry cooled to 25° C. was added 5% by weight of sulfuric acid (molar ratio of $H_2SO_4/Al_2O_3=0.75$) thereby effecting acid treatment. And then, 4 liters of aqueous solution containing 123.6 g sodium silicate (No.1 water glass, 36.5% by weight in terms of $SiO_2$) was added and agitated for 60 minutes. While the temperature of the slurry was kept to 50° C., 11.5 g of stearyl ether phosphoric acid was added to carry out surface-treatment. Thereafter, the slurry was filtered to form a cake under reduced pressure with a Buchner funnel, and the cake was washed with a quantity of water equivalent to about 50 times of the $Al_2O_3$ content in weight. After washing, the cake was dried overnight at about 110° C. to obtain 380 g of white powder.

The obtained white powder was subjected to chemical analysis. As the result, it had the composition of $[Al_2(Li_{0.90}.Mg_{0.30}(OH)_{6.4}]_2(SiO_2)_{1.10}.3.0H_2O$.

It had a BET speific surface area of 12.5 m²/g, an average particle size of 0.7 μm and a refractive index of 1.50.

This white powder was dried at 200° C. for 3 hours to obtain one containing 0.3 mole of water (3 hours-burned product) was subjected to the agricultural film-preparing test as after-mentioned.

EXAMPLE 7

The complex hydroxide salt obtained in Example 6 was burned for a hour at 210° C. and was added in amounts of 5, 7.5 and 10 parts by weight to obtain film in similar manner as in Example 3. The heat insulation efficiency and the total light transmittance percent (%) are shown in table 1.

COMPARATIVE EXAMPLE 1

Water was added to a mixture of 214.0 g of powdery aluminum hydroxide containing 65% by weight of $Al_2O_3$ and 55.0 g of lithium carbonate to make 3 L of slurry in the total volume.

This slurry was subjected to heat treatment in 5 L of an autoclave at 150° C. for 4 hours. While the temperature of the slurry was kept to 80° C., 11.5 g of sodium stearate was added to carry out surface-treatment. Thereafter, the slurry was filtered to form a cake under reduced pressure with a Buchner funnel, and the cake was washed with a quantity of water equivalent to about 50 times of the $Al_2O_3$ content in weight. After washing, the cake was dried overnight at approximately 110° C. to yield 300 g of white powders.

The obtained white powders were subjected to chemical analysis. As the result, it had the composition of $[Al_2Li(OH)_6]_2(CO_3).3.0H_2O$. It had a BET specific surface area of 8.5 m²/g, an average particle size of 1.0 μm and a refractive index of 1.55.

COMPARATIVE EXAMPLE 2

The infrared absorber obtained in Comparative Example 1 was used to measure the heat insulation efficiency and the total light transmittance percent (%) of the agriculcural film in a similar manner as in Example 3. The results were as shown in table 1.

TABLE 1

| No. | Amount Incorporated (PHR) | Heat Insulation Efficienty | Total Light Transmittance Percent (%) |
|---|---|---|---|
| Example 3 (LDPE) | 5.0 | 46.90 | 85.20 |
|  | 7.5 | 52.84 | 83.18 |
|  | 10 | 55.24 | 80.14 |
| Control (LDPE) | 0 | 25.44 | 94.11 |
| Example 4 (PVC) | 5.0 | 65.21 | 91.03 |
| Control (PVC) | 0 | 60.18 | 96.02 |
| Example 7 | 5.0 | 48.5 | 85.30 |
|  | 7.5 | 54.2 | 83.21 |
|  | 10 | 56.85 | 80.25 |
| Comparative Example 2 (LDPE) | 5.0 | 43.01 | 73.73 |
|  | 7.5 | 47.25 | 62.19 |
|  | 10 | 51.03 | 60.34 |

INDUSTRIAL APPLICABILITY

The infrared absorber composed of the complex hydroxide salt of the present invention has a high ability to absorp infrared rays, an excellent dispersibility with the resins and a refractive index close to that of the resin so that it is easily incorporated in the resin and resin processing is facilitated, and the shaped film therefrom is excellent in the heat insulation property and transparency so that it is suitable as an agricultural film.

What is claimed is:

1. An infrared absorber which is characterized by containing as an ingredient a hydroxide complex salt represented by the formula:

$(Al_2(Li_{(1-x)}.M^{2+}_{(x+y)}(OH)_{(6+2y)})_n(A^{n-})_{(1+x)}.mH_2O;$ wherein $M^{2+}$ is a divalent metal, $A^{n-}$, is an anion having a valence of n; and m, x and y are numbers respectively in the ranges of $0 \leq m < 5$, $0.01 \leq x \leq 0.5$ and $0 \leq y \leq 0.5$.

2. An infrared absorber wherein the hydroxide complex salt as claimed in claim 1 is coated with one or more of compounds selected from a group consisting of higher fatty acids, higher fatty acid salts, esters of higher aliphatic alcohol and phosphoric acid, waxes, nonionic surfactants, cationic surfactants and coupling agents.

3. An agricultural film comprising per 100 parts by weight of a resin:

1 to 50 parts by weight of the hydroxide complex salt as claimed in claim 1.

4. An agricultural film comprising per 100 parts by weight of a resin:

1 to 50 parts by weight of the hydroxide complex salt as claimed in claim 1; and 0.02 to 5 parts by weight of a hindered amine light stabilizer.

5. An agricultural film comprising per 100 parts by weight of a resin:

1 to 50 parts by weight of the hydroxide complex salt as claimed in claim 1; and 0.02 to 5 parts by weight of an anti-fogging agent.

6. An agricultural film comprising per 100 parts by weight of a resin:

1 to 50 parts by weight of the hydroxide complex salt as claimed in claim 1; and 0.02 to 5 parts by weight of an anti-haze agent.

7. An agricultural film comprising per 100 parts by weight of a resin:

1 to 50 parts by weight of the hydroxide complex salt as claimed in claim 2.

8. An agricultural film comprising per 100 parts by weight of a resin:

1 to 50 parts by weight of the hydroxide complex salt as claimed in claim 2; and 0.02 to 5 parts by weight of a hindered amine light stabilizer.

9. An agricultural film comprising per 100 parts by weight of a resin:

1 to 50 parts by weight of the hydroxide complex salt as claimed in claim 2; and 0.02 to 5 parts by weight of an anti-fogging agent.

10. An agricultural film comprising per 100 parts by weight of a resin:

1 to 50 parts by weight of the hydroxide complex salt as claimed in claim 2; and 0.02 to 5 parts by weight of an anti-haze agent.

* * * * *